Patented June 17, 1930

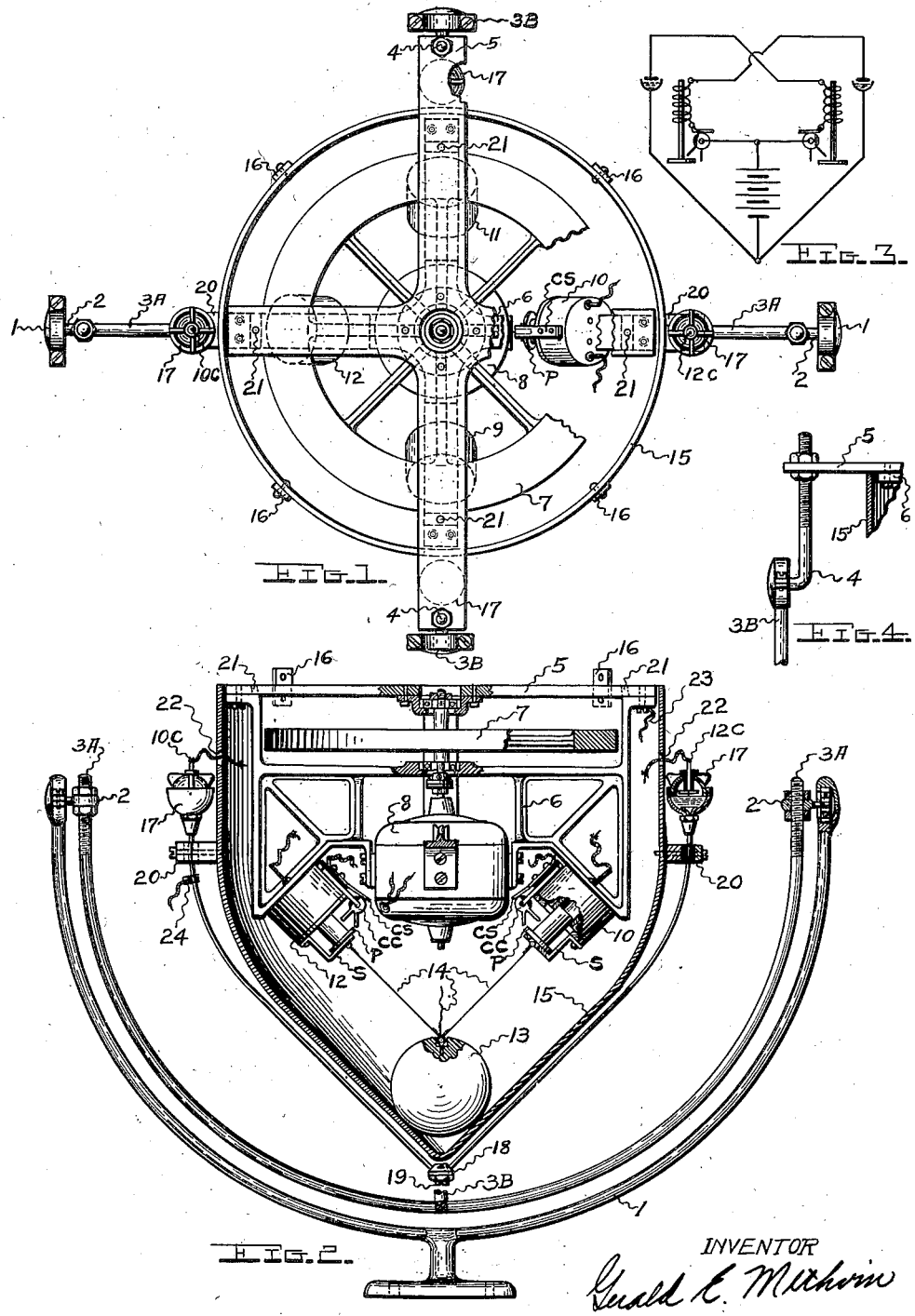

1,763,806

UNITED STATES PATENT OFFICE

GERALD E. METHVIN, OF BALTIMORE, MARYLAND

STABILIZED GYROSCOPIC INSTRUMENT

Application filed August 24, 1927. Serial No. 215,018.

This invention has for its object the provision of means whereby a fixed level plane, in relation to the earth's surface, suitable for practical purposes, may be stabilized on an unstable vessel, vehicle or craft. More specifically, the instrument herein shown and described is designed for use with an aircraft drift indicator of the character shown and described in my application for patent, Serial No. 215,019, filed Aug. 24, 1927. However, my invention is not limited to such use, but may be used as an inclinometer and for other purposes.

I have mounted the instrument of my invention universally, and have used a single gyroscope to stabilize the instrument in a fixed level position against the speed, pitching, rolling, yawing or swaying of the conveyance on which it is carried. It is well understood, however, that where there is unbalance in a gyroscope, pressures against the entire instrument such as the resultant of gravity, in acceleration pressures, will cause the gyroscope to precess from its fixed position. It is also understood that, the earth being spherical, any change in positions on or near the earth's surface as the result of travel, or any change in the position of the earth due to rotation, will change the relation of the gyroscope's fixed position to the level of the earth's surface.

Although I have provided means for balancing my instrument, with the instrument or device which it stabilizes, as nearly as possible against acceleration pressures, even this is subject to slight errors when used on conveyances that, while pitching and rolling, accelerate to very high speeds. To maintain the desired level against this, the surface and position differences of the earth, I have employed an automatic system of detecting any slight move of the instrument from its level plane and distributing weight and inertia against the balance of the gyroscope in the proper direction to cause it to precess back to its level plane, at which time the automatic system is inactive.

From the above and the following description it will be obvious that I have materially economized in equipment in securing the desired result, by using a single gyroscope as a stabilizing unit and by placing the gyroscope, its driving medium and its correcting equipment in a single receptacle, universally mounted.

In order that my invention may be better understood I shall now give a detailed description to accompany the drawings, wherein:

Fig. 1 is a plan view of one form of instrument embodying my invention; Fig. 2 is a vertical elevation thereof as it appears with approximately half of the bumper case and the forward solenoid and its framework removed, the forward and rear uprights of the level assembly are also removed to clearly show its insulation from the bumper case; Fig. 3 is a schematic wiring for solenoids and level contacts on opposite sides of the instrument showing the relation between the contacts and the solenoids; Fig. 4 is a partial view of a side of the instrument showing the arrangement at the ends 3B of the floating bracket.

The instrument herein shown comprises a mounting stand 1, the bracket ends of which are designed to receive ball bearings in which run the ends of the balancing adjustment collars 2, through which slide the ends 3A of the floating bracket which are threaded for locking same in place. The ends 3B of the floating bracket are designed to receive ball bearings in which run the horizontal ends of the balancing adjustment supports 4 the vertical ends of which are threaded for locking same in adjustment and which slide through the ends of the longer cross-arms of main framework support 5 for adjustment.

To the main framework support 5 is underslung the gyroscope and solenoid framework 6. Gyroscope 7 runs in ball bearings and is driven by a small motor 8. While the type of motor used is optional, in the present instrument I prefer to use a General Electric Co.'s SDA type, 1/200 H. P. D. C. motor which has the regular #300 frame replaced with an aluminum frame with four flat surfaces for mounting.

The solenoids 9, 10, 11 and 12 are designed with plungers P, plunger stops S, circuit cutouts CC and tension and contact springs CS. The arrangement of the circuit cut-out disc is such that electrical contact is made with the tension and contact spring with the solenoid plunger in its normal position, but which is moved by the plunger collar so that the insulated portion of its disc breaks contact slightly before the plunger is completely drawn into the solenoid. The tension and contact spring is held insulated from the framework between fiber, its controlling connection being made at the circuit cut-out and its wiring connection being made at the end away from the circuit cut-out by means of a soldered connection. The tension of the tension and contact spring against the circuit cut-out disc is such that the weight of the plunger at its forty-five degree angle drop will not return it to its normal position, but such that all four plungers will restore with the added pull of ¼ of the balance and inertia weight 13.

The balance and inertia weight 13 is suspended from the four armatures by means of four strong flexible connections 14 (in the present instrument I have used piano wire) secured to screw rings in the armatures and to a screw ring set in a counterbore in the weight. This arrangement at the weight is so that the point of suspension is at a point just at the surface of the weight. With the suspensions and bumper case 15 being at a forty-five degree angle from vertical, when one plunger lifts the weight from its position the connections at right angles to the weight tend to buckle slightly while the connection directly opposite swings the weight in an arc, lifting it away from bumper case 15 with a minimum of friction.

The balance and inertia weight in the present instrument is brass.

It is intended that the instrument which is stabilized, by the instrument herein shown and described, shall be mounted on the main framework support 5 by means of four screws in screwholes 21.

Bumper case 15 in the present instrument is provided with four riveted flanges 16 and it is intended that said bumper case shall be supported from the outer walls of the instrument, which is mounted upon the instrument herein shown and described, by means of four screws.

Level assembly 17 comprises four upright pipes, an adjustment chamber 18, a displacement adjusting screw 19 which is locked by means of a nut, an electric conducting liquid and an insulated electric conductor contact in each of the caps which are screwed into the lobes at the four vertical ends of the uprights. The entire container assembly is an electric conductor. The four upright pipes of the level enter the adjustment chamber 18 at a forty-five degree angle and are held rigid and insulated from bumper case 15 by means of four insulated cleats 20. Each of the contacts closes a circuit to a solenoid spaced 90 degrees from it in the direction from which the wheel is spinning 12C to 11, 10C to 9, etc.

In the level described above, I have used mercury as a liquid conducting medium to secure weight against speed and owing to its relatively poor conductivity have provided a large contact surface. To prevent serious temperature differences I have used an aluminum container which, to some extent, expands and contracts with the mercury. I have used the following method in assembling the level: With the four caps removed and with the displacement adjusting screw 19 turned to its limit into the adjustment chamber 18, mercury is poured into one of the uprights until its level has raised in the four uprights to the approximate point of making contact with the insulated contacts when the four caps shall have been screwed in place. The four caps are then inserted and tightened. The assembly is then held with the tops of the uprights in a level plane and all four contacts tested to insure that the mercury is in contact with all. The temperature of the assembly is then bought up to approximately the maximum temperature to be encountered and the displacement adjusting screw backed out until there is no electrical contact between the insulated contacts and the container. The displacement adjusting screw is then locked in position. It will be noted that the remaining air in the four caps is rarefied by the above method without causing a complete vacuum.

The equipment for producing the power for the motor and solenoids will vary with the conveyances, on which this instrument is carried, and as this forms no part of the present invention, it is not detailed in this specification.

It is intended that the wiring from the motor and solenoids, to the power source, shall be a flexible cable and brought from the instrument through one of the wiring outlets 22, carried to the top of the assembly and suspended in such manner that it will not interfere with the movement of the instrument. Lug 23 is provided as a means for connecting the positive side of the source of power, for the solenoids, to the framework, and cleat 24 to connect negative side to level container.

The operation is as follows:

The entire assembly, with the instrument, mechanism or device which is mounted upon it, and which it keeps on a level plane, being the containing framework of the gyroscope, said gyroscope is neutrally mounted when the entire assembly is in balance, said balance being obtained by ba'ancing adjustment collars 2, balancing adjustment supports 4 and with the balance and inertia weight 13 in its central, normal position. The gyroscope, together with the gyroscopic action of the motor armature, holds the instrument stabilized in space, regardless of the movement or position of its support, the mounting stand 1.

Should the gyroscope precess from the plane it is stabilizing, in relation to the level of the earth's surface, the conducting liquid in the level 17, in seeking its level, makes contact with one, or possibly two, of the insulated contacts in the four lobe caps. If only one of the four contacts are made the action is as follows: The solenoid associated with that contact energizes over a circuit from source, to framework, through circuit cut-out contact, tension and contact spring, solenoid winding, level contact, conducting liquid, container and back to source.

The weight is pulled up with the solenoid plunger until the plunger has reached its approximate limit, at which time the circuit cut-out is thrown by the collar on the plunger P, and the energizing circuit is broken by the insulated portion of the disc. The weight and plunger then fall back to their normal positions and slightly before the plunger reaches its normal position the circuit is again closed by the plunger collar moving the uninsulated portion of the circuit cut-out disc into contact with the spring, provided the circuit is still closed through the level contact, and the pumping action continues until the contact has been raised above the level of the conducting liquid.

By the above it will be seen that, by the inertia of the pull against the weight being moved from its normal position, the unbalance of the instrument with the weight in its extreme off-normal position, and the shock of inertia when the weight is brought to a stop on reaching its normal position, produce the effect of a couple whose axis is perpendicular to the axis of spinning, tending to move the gyroscope axis back into the vertical position.

If two circuits to the solenoids should be closed simultaneously, the direction of the force of said weight is against the instrument, at a 90 degree angle from a center point between the two ends of the level at which contacts are made.

Should one level contact close and before the weight has reached its extreme off-normal position, a second contact should close, the first solenoid continues its action until its circuit is broken. The tension against the cut-out discs being such that the weight of the armature alone cannot restore them, the circuit of the first solenoid is kept open until the weight is released by the second solenoid and has returned to its normal position. The two solenoids then operate simultaneously.

While I have, throughout this specification, described in more or less detail certain specific embodiments of my invention, it should be understood that this is susceptible to considerable modification without exceeding the scope of my claim, as the instrument herein described has been designed for use with an instrument of a special character as told in the second paragraph in this application. My invention should be understood as covering all adaptations and variations such as fall within the scope of the appended claim.

Having now described my invention, what I claim as new and desire to secure by Letters Patent is:

A gyroscopic stabilizer for use on an unstable platform comprising a support, a frame, gimbal bearings interposed between said frame and support, a gyroscope mounted in said frame for spinning about a vertical axis, four liquid containers equi-distantly spaced on the frame about the spin axis, means connecting said containers for intercommunication, said containers being adapted to contain a conducting liquid, a weight, solenoids corresponding in number to said containers spaced on the frame about the spin axis, means connecting each solenoid with the weight to move the same to throw the frame out of balance upon actuation of any one or more of the solenoids, contact means carried by each container and adapted to be closed by the liquid therein, and circuit means whereby each solenoid is controlled by one of the liquid containers and its contact to cause the frame to precess into the vertical upon departure therefrom.

GERALD E. METHVIN.